(No Model.)

O. C. HUBBELL.
SKYLIGHT.

No. 291,057. Patented Jan. 1, 1884.

Witness,
E. W. Laird.
G. W. Tibbitts.

Inventor,
Oliver C. Hubbell
By Geo. W. Tibbitts Atty.

UNITED STATES PATENT OFFICE.

OLIVER C. HUBBELL, OF CLEVELAND, OHIO.

SKYLIGHT.

SPECIFICATION forming part of Letters Patent No. 291,057, dated January 1, 1884.

Application filed August 12, 1882. (No model.)

*To all whom it may concern:*

Be it known that I, OLIVER C. HUBBELL, of Cleveland, in the county of Cuyahoga and State of Ohio, have invented certain new and useful Improvements in Glass Roofs or Skylights, of which the following is a specification.

The nature and objects of these improvements relate to the peculiar construction and arrangement of the glass plates composing the roof, as hereinafter described and claimed. Said plates have concavo-convex surfaces, and the convex side of the sheets has a straight flange at one end, and the concave side has a flange with a bevel side, said flanges lapping and forming a space to prevent the effect of capillary attraction and to avoid leakage. The concave surface, being placed uppermost in constructing a roof, serves to conduct water to the central part, as hereinafter shown.

Figure 1:
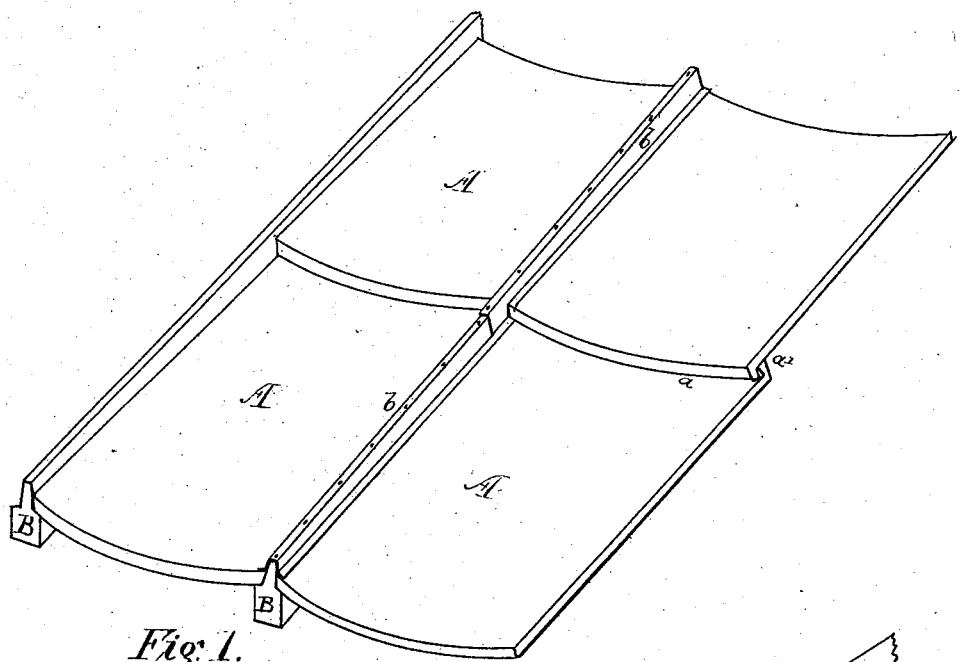
Figures 2, 3:
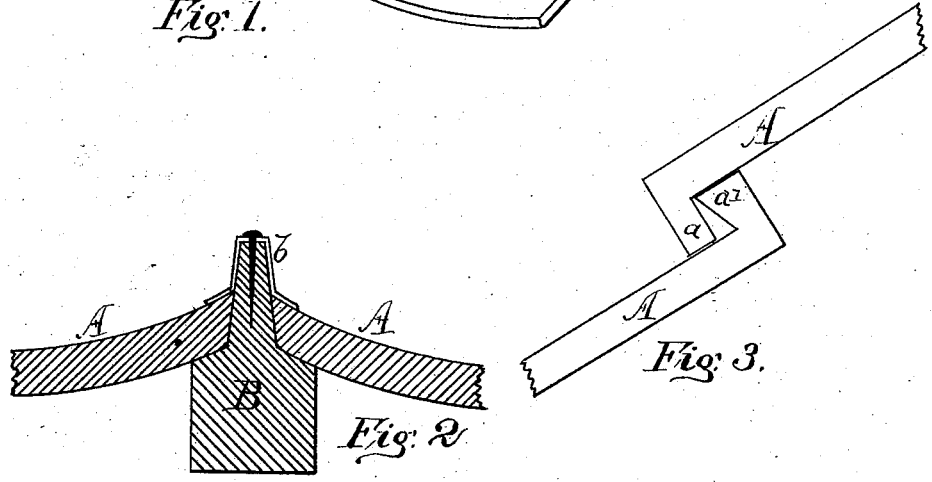

In the accompanying drawings, which form a part of this specification, Figure 1 represents a perspective view of my improved form of skylights or glass roofing. Fig. 2 represents a portion of same in transverse section, showing how the glass plates are secured to the sash-rail. Fig. 3 represents a side view of the glass plates embodying my invention, showing the manner of connecting their ends.

In the drawings, A are glass plates, which I make in curved concavo-convex form, for the purpose of forming troughs for leading or directing the water which falls on them away from the edges and joints at the sides of the plates toward their central part, whereby the said joints are relieved from resisting the usual excessive quantity and flow of water, and thereby overcome and avoid the liability of leakage, or of any great degree of leakage, should the joints become loose or open. At the lower ends of said sheets of glass I form a right-angle flange, $a$, turned downward from the convex surface, and at their upper ends a beveled upwardly-turned flange, $a'$. The inside surface of said flange is beveled under, as shown, for the purpose of breaking surface contact of said flanges $a$ $a'$, to overcome the effects of capillary attraction. The bevel, forming a chamber between the flanges, prevents the accumulation of water, and the effects of attraction upon the water cannot therefore take place.

B is a sash rail or bar for supporting the glass plates A, and consists of a wooden or metal rail having rabbeted sides, upon which the side edges of the plates lie, and to which they may be cemented or puttied in the usual manner. Over the projecting edge of the said rail is placed a metal cap, $b$, having bent edges overlying the edges of the glass plates, that may be secured by nails or screws forming the joint, as shown in Fig. 2.

From the foregoing it will be seen that rain falling on a roof of this construction is immediately led away from the edges or sides of the plates to their central part, forming a perfect basin or trough for conveying the water off from the roof, so there can be no water remaining at the sash-joints, and so that the overlying flanges $a$ $a'$, as shown and described, form a barrier against the attraction of water in the seams.

Having described my improvement, I claim—

The glass plates A, formed with concavo-convex surfaces, and having a straight flange, $a$, and a beveled flange, $a'$, formed on their ends, in combination with sash-rails B, substantially as shown and described.

OLIVER C. HUBBELL.

Witnesses:
GEO. W. TIBBITTS,
M. G. NORTON.